(12) United States Patent
Kempf et al.

(10) Patent No.: US 8,146,799 B2
(45) Date of Patent: Apr. 3, 2012

(54) PRODUCT INFORMATION SYSTEMS AND METHODS

(75) Inventors: Thomas P. Kempf, Plymouth, MN (US); Richard J. Kaiser, Allentown, PA (US); Francis G. Schiro, Doylestown, PA (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 12/774,317

(22) Filed: May 5, 2010

(65) Prior Publication Data

US 2010/0282836 A1 Nov. 11, 2010

Related U.S. Application Data

(60) Provisional application No. 61/175,875, filed on May 6, 2009.

(51) Int. Cl.
*G06F 17/00* (2006.01)
(52) U.S. Cl. .......... 235/375; 235/383; 705/14.1; 705/80
(58) Field of Classification Search .................. 235/375, 235/383; 705/80, 14.1
See application file for complete search history.

(56) References Cited

U.S. PATENT DOCUMENTS

| | | | |
|---|---|---|---|
| 6,434,530 B1 | 8/2002 | Sloane et al. | |
| 6,604,681 B1* | 8/2003 | Burke et al. | 235/383 |
| 7,386,477 B2* | 6/2008 | Fano | 705/26 |
| 7,778,886 B1* | 8/2010 | Maroney et al. | 705/26 |
| 2005/0091124 A1* | 4/2005 | White | 705/26 |
| 2006/0032922 A1* | 2/2006 | Philyaw et al. | 235/455 |
| 2007/0090186 A1 | 4/2007 | Lawrence et al. | |
| 2007/0156452 A1* | 7/2007 | Batch | 705/2 |
| 2007/0192183 A1 | 8/2007 | Monaco et al. | |
| 2008/0033835 A1* | 2/2008 | Philyaw | 705/26 |
| 2008/0093460 A1 | 4/2008 | Frantz et al. | |
| 2009/0050698 A1* | 2/2009 | Storey et al. | 235/383 |
| 2009/0131089 A1* | 5/2009 | Micali et al. | 455/466 |
| 2009/0170483 A1* | 7/2009 | Barnett et al. | 455/414.2 |
| 2009/0182622 A1* | 7/2009 | Agarwal et al. | 705/10 |
| 2009/0248537 A1* | 10/2009 | Sarkeshik | 705/26 |
| 2010/0179857 A1* | 7/2010 | Kalaboukis et al. | 705/10 |
| 2010/0280960 A1* | 11/2010 | Ziotopoulos et al. | 705/80 |

OTHER PUBLICATIONS

Scanbuy, Inc., *"Scanbuy Launches Barcode Registration Service to Link Everyday Products to Valuable Content via the Camera Phone"*, http://www.scanbuy.com/web/press-kit/117-scanbuy-launches-barcode-registration-service-to-link-everyday-products-to-valuable-content-via-the-camera-phone.html.

Duncan Graham-Rowe, May 21, 2009, *"Innovation: How Cellphones Will Enhance Reality"*, http://www.newscientist.com/article/dn17174-innovation-how-cellphones-will-enhance-reality.html.

(Continued)

*Primary Examiner* — Allyson Trail
(74) *Attorney, Agent, or Firm* — Arlene L. Hornilla; Michael Feller

(57) ABSTRACT

Embodiments provide product information to a person viewing a product by capturing a product identifier image associated with the product, determining a product identifier from the image, and retrieving product information from a product database using the product identifier. In some cases the product information is filtered prior to display using a profile that includes criteria set by the user. Embodiments provide product information via a handheld computing device, which in some cases can be a mobile phone or other such device that also includes a camera for capturing product identifier images.

26 Claims, 12 Drawing Sheets

OTHER PUBLICATIONS

Amy Corr, Sep. 21, 2009, *Media Creativity*, *"Coke Promo: Scan Soda Can, Get Mobile Content"*, http://www.mediapost.com/publications/?fa=Articles.printFriendly&art_aid=113950.

Microsoft, *"Custom Tags—Start Now!!"*, http://www.microsoft.com/tag/content/overview/CustomTags.aspx.

Microsoft, *"Microsoft Tag: Frequently Asked Questions"*, http://www.microsoft.com/tag/content/faq/.

Scanbuy, Inc., 2008, *"ScanLife Client Application User Guide"*, This Document Shows How to Install and Use the ScanLife Client Application, v.1.1.0.

Scanbuy, Inc., *"ScanLife Mobie Application"*, http://www.scanbuy.com/web/scanlife-mobile-application?tmpl=component&print=1&page=.

Scanbuy, Inc., 2007, *"ScanLife Platform & Registry"*, http://www.scanbuy.com/web/scanlife-platform-a-registry.

Andrew Lavallee, May 29, 2009, *"Unilever to Test Mobile Coupons"*, The Wall Street Journal, http://www.wsj.com/article/SB124354778 510364127.html?mod=dist_smartbrief.

ColorZip, Apr. 19, 2010, *"What is Zap Code™?"*, Singapore Press Holdings, http://www.colorcode.com.sg/index.php?option=com%20content&task=view&id=73Itemid=49.

ColorZip, Apr. 19, 2010, *"What is ColorCode, Art in Every Space"*, http://www.colorcode.com.sg/index.php?option=com%20content&task=blogcategory&id=0&Itemid=26.

\* cited by examiner

PRODUCT INFORMATION SYSTEMS AND METHODS

CROSS-REFERENCES

This application claims priority from U.S. Provisional Application Ser. No. 61/175,875, filed May 6, 2009, and titled "Dynamically Interactive Packaging," the contents of which are hereby incorporated by reference in their entirety.

FIELD

This disclosure generally relates to products and providing information about products. More particularly, this disclosure relates to devices, systems, and methods for providing product information to a person considering and/or using a product.

BACKGROUND

Manufacturers have long relied on multiple methods for communicating with potential purchasers and users of the manufacturers' products. Such communications can serve various purposes, such as advertising and promoting the products, making required disclosures about the products, and providing instructions and other information helpful in using the products. While these types of communications can take place in a variety of locations, one prime location for such communications is on or in the vicinity of a product itself. For example, a manufacturer may print communications on product packaging, on inserts and instruction manuals, on signage placed next to the product, and in some cases on the product itself. Such locations allow communication with a potential purchaser about the product as the purchaser is actually contemplating the purchase of the product. Similarly, communications in such locations can provide a user of a product with ready access to information necessary or helpful in using the product.

While such communications are extremely useful and effective in promoting a manufacturer's products, the nature of their location inherently limits characteristics of the communication such as its length, content, and format. For example, communication of printed information on product packaging is effectively limited by the size of packaging and its finite surface area. In addition, information communicated through package inserts, instruction manuals, and the like may be sealed within product packaging and may not be available to potential purchasers considering purchasing a product. Signage for a product may not always be feasible in certain display environments, and may become separated from the product, thus limiting its effectiveness. Also, regardless of location, communications in printed format are fixed upon printing, and thus only provide a one-time communication that cannot be changed or manipulated without discarding the outdated printing (and corresponding packaging/product/signage/etc.) in favor of new printing.

SUMMARY

Embodiments of the invention generally provide information about a product to a person viewing the product, such as a potential purchaser and/or a user of the product. According to some embodiments the product information can be filtered based on a user profile in order to provide desired and relevant information regarding the product, based on the preferences and needs of a person viewing the product.

One aspect of the invention includes a method for providing product information. The method includes generating a digital characterization of a product identifier image with a handheld device. The product identifier image can be associated with a product. The method can also include using the handheld device to determine a product identifier of the product based on the digital characterization of the product identifier image. In some embodiments the handheld device includes a computer-readable storage medium, and the method includes retrieving product information for the product from the storage medium using the product identifier. The method also includes filtering the product information using a profile stored in the handheld device and displaying at least part of the filtered product information with the handheld device.

According to another aspect of the invention, a handheld device is provided that is capable of providing product information. The device can include a processor, a display, and a computer-readable storage medium, among other components. The computer-readable storage medium includes instructions executable by the processor for providing product information. In some cases the instructions include generating a digital characterization of a product identifier image with the handheld device. The product identifier image is associated with a product. The instructions also provide for determining a product identifier of the product with the handheld device based on the digital characterization of the product identifier image and then retrieving product information for the product from the computer-readable storage medium using the product identifier. The product information is filtered using a profile stored in the handheld device to generate filtered product information, and at least part of the filtered product information is displayed with the display of the handheld device.

According to another aspect of the invention, a method for providing product information is provided. The method includes providing packaging for a product with a product identifier image and providing access to a product information application and at least one product database for a handheld device through a product information web server. A request from a user to use the product information application on the handheld device is received through the product information web server and information is requested from the user and used to generate a profile for the user. In some cases the product information application comprises instructions executable by a processor of the handheld device to generate a digital characterization of the product identifier image, determine a product identifier of the product based on the digital characterization of the product identifier image, retrieve product information for the product from a computer-readable storage medium in the handheld device using the product identifier, filter the product information with the profile to generate filtered product information, and cause at least part of the filtered product information to be displayed with the handheld device.

Embodiments of the invention may provide one or more of the following features and/or advantages. In some cases, embodiments of the invention provide quick and reliable access to product information stored locally on a handheld device such as a mobile telephone. Some embodiments unlock and provide access to product information only after scanning or capturing the product identifier image and determining the product identifier from the product identifier image. Embodiments can provide a variety of information related to a product, including promotional information such as coupons and discounts and information about related products. In some cases capturing the product identifier image can unlock and provide access to promotional information (e.g., entertainment-related information such as music, video, articles, books, subscriptions, software, etc.) as an incentive for a user to view and/or purchase the product. In some cases product information is displayed during point-of-sale consideration of the product, thus providing a potential purchaser with additional information that can help promote a product. In some cases product information can also or alternatively be displayed after point-of-sale, such as during the use of the product. In some cases a query is generated after retrieving the product information, which allows the product information to be filtered and/or displayed based on additional user inputs in response to the query. The display of product information can thus be tailored even further for a particular user based on, e.g., experience level.

Embodiments of the invention are capable of storing, retrieving, filtering and/or displaying product information about a wide variety of products in multiple industries. In some cases product information is provided for one or more food products. For example, food product information can be filtered using a profile that includes dietary restrictions and/or food preferences. In some cases recipe information and/or meal information related to the product can be retrieved and displayed to a user. Information about related products can thus be provided and in some cases one or more related products and/or ingredients from a recipe or meal may be added to a shopping list. With respect to food products and products in other industries, embodiments of the invention may also provide expanded product information related to cost, efficiency, expert guidance, instructions for use, knowledge archives, decision assistance, entertainment, planning, organization, simplification, and positive outcome, among other categories of information.

Embodiments of the invention provide for dynamic and/or interactive communication with users and potential purchasers of a product, providing selective and adaptive product information, based on preferences and changing context, in contrast to the static print information traditionally available for products. Embodiments thus provide the possibility for improved communication with purchasers and users, and can improve and enhance the relationship between the brand/product and the user/consumer, especially when compared with printed product labels, packaging, and the like. Embodiments of the invention also allow product information to be conveyed through one or more formats such as text, graphics, sound, video, and combinations thereof. In some cases embodiments advantageously interact with a user to customize the display of product information, thus providing flexibility in product communications not available for printed packaging and labels. Some embodiments interact with a user by receiving profile information and/or inquiry responses, and can then filter and display product information based on the user inputs. In addition, embodiments of the invention can provide greater amounts of information to a product user/purchaser compared with the current state of the art.

These and various other features and advantages will be apparent from a reading of the following detailed description.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Embodiments of the invention are useful for providing product information about one or more products to a person viewing the product, such as a user of the product or a potential purchaser of the product. As discussed further herein, a number of examples of providing such product information are presented in the context of food products, though these are meant to be non-limiting examples of the invention. As will be appreciated from review of the following disclosure, embodiments of the invention are applicable to many different industries and may be useful for communicating product information concerning a wide variety of products.

Figure 1:
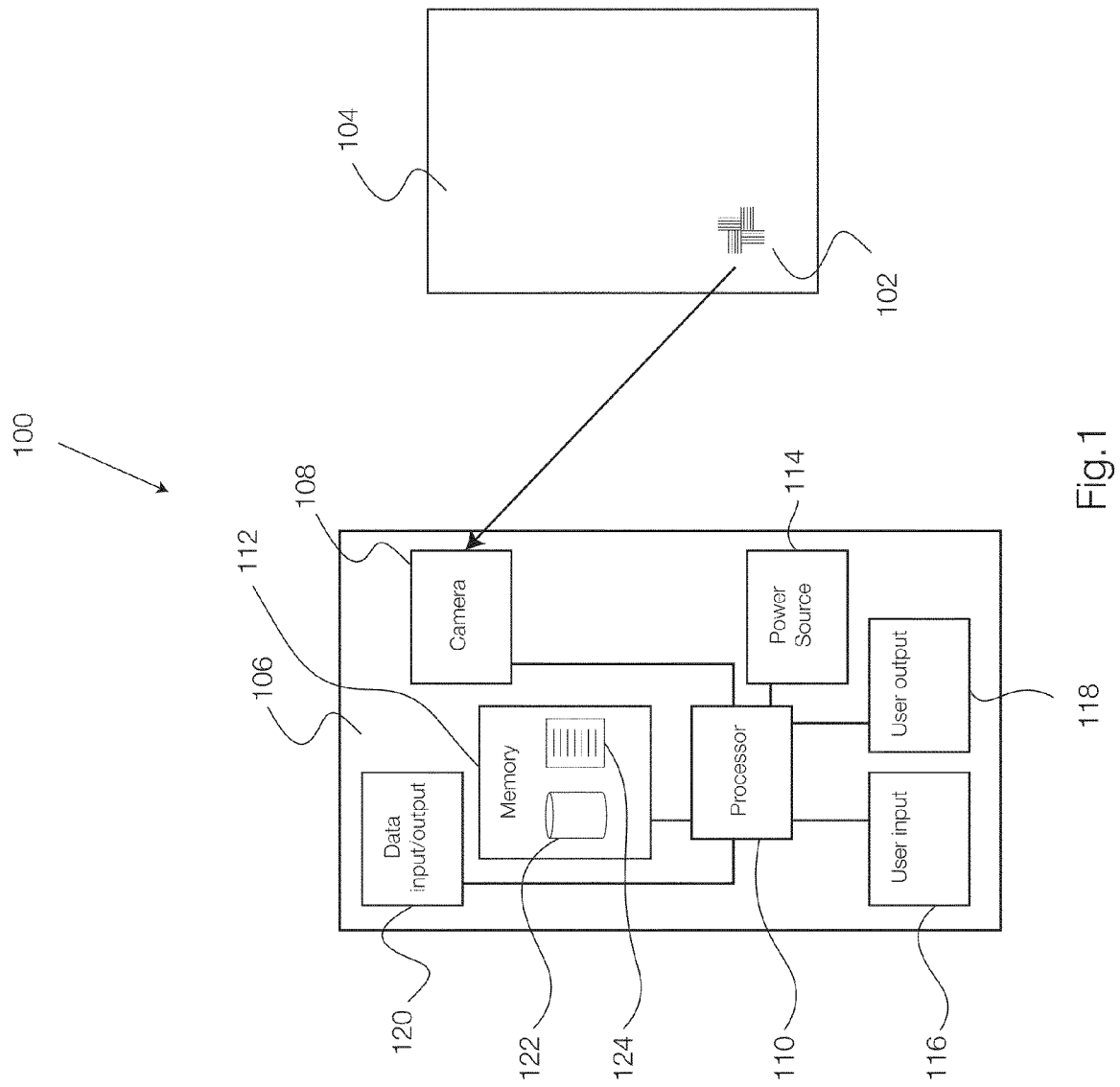
FIG. 1 is a block diagram of a product information system according to some embodiments of the invention.

FIG. 1 is a block diagram of a product information system 100 according to some embodiments of the invention. The product information system 100 generally includes a product identifier image 102 associated with a particular product 104, and a handheld device 106. The handheld device 106 is capable of recognizing the product identifier image 102 and displaying product information related to the product 104 to a person using the handheld device 106 and viewing the product 104. In some cases the system 100 may include multiple product identifier images associated with multiple respective products and/or multiple handheld devices for multiple users. According to some embodiments, the handheld device 106 includes an image capturing device 108, such as a camera, that scans the product identifier image 102. The handheld device 106 then determines a product identifier (e.g., a unique name, code, or other such identifying data) from the product identifier image 102 and uses it to retrieve product information related to the product 104. According to some embodiments, prior to displaying the product information, the handheld device 106 may also filter the product information based on a user profile, so that the displayed product information is customized or tailored according to criteria in the profile.

The handheld device 106 can take a number of forms. According to some embodiments, the handheld device 106 is a mobile telephone, (e.g., a cell/mobile phone), a smartphone, a personal digital assistant, or some other handheld device having computing capabilities. In certain embodiments the handheld device 106 may also be a laptop computer, a tablet computer, a netbook, or another type of more fully featured portable computer. FIG. 1 provides a high-level block diagram of certain components common to some embodiments of the handheld device 106. It should be appreciated that FIG. 1 is a simplified diagram that highlights a number of components for purposes of this disclosure, but that in most cases the handheld device 106 also includes a multitude of other components, functions, and/or features beyond the scope of this disclosure that are not shown in FIG. 1. For example, the handheld device 106 may be a mobile phone, in which case those skilled in the art will appreciate that FIG. 1 merely represents the device at the highest level, and that in reality, the device includes a number of components not shown in FIG. 1 for the sake of simplicity and clarity.

In certain embodiments the handheld device 106 at least includes a processor 110 (e.g., a microprocessor), a memory component 112, a power source 114, a user input 116, a user output 118, and a data input/output port 120. In the most basic terms, the data input/output port 120 allows the device 106 to transmit and receive data, and may in some cases include multiple ports using the same or different communication protocols. For example, in the case of a mobile phone, the device 106 includes an input/output port for communicating with a cellular network, and may also include a number of other ports enabling wired and/or wireless data transmission via standards such as USB, infrared, Bluetooth and/or wireless local area network (e.g., IEEE 802.11). The user output 118 can include any visual and/or audio output device suitable for conveying information to the user of the device 106, such as a display screen and/or audio speakers. In some cases the user output 118 may also function as the user input 116, such as in the case of a touch-sensitive display screen, though the device 106 may also or alternatively include a dedicated user input device such as a keypad and/or pointing device.

The memory component 112 can be any suitable computer-readable storage medium that stores executable instructions (e.g., software programming instructions) that when executed by the processor 110 allows the device 106 to carry out desired functions. In some cases the memory component 112 may include volatile and/or non-volatile memory, including read-only memory, flash memory, magnetic storage media such as hard/floppy disks, and/or optical discs among other forms of computer memory. The device 106 may in some cases include two or more separate memory components. For example, in some cases the device 106 may include integral read-only memory storing a device operating system, integral read-write memory storing software, application data, and/or user data, and a removable memory module such as a flash-based memory card, magnetic floppy disk, or optical storage disk that stores additional application and/or user data.

According to some embodiments, the memory component 112 stores both a product database 122 and a user profile 124. The product database 122 includes product information related to the product 104, in addition to product information related to multiple additional products. In some embodiments, the memory component 112 can optionally store two or more distinct product databases containing product information related to different products (e.g., products in distinct industries or from separate manufacturers). The database can be organized in any suitable fashion known in the art. The user profile 124 includes one or more criteria related to a specific user, such as the product preferences of a person using the product information system 100. In some embodiments the memory component 112 also contains executable instructions in the form of a software application that allows the processor 110 and handheld device to execute one or more functions to provide product information to the device user. For example, in some cases the handheld device 106 identifies or retrieves product information from the product database 122 and then filters the product information using the profile 124 prior to displaying the filtered product information using the user output 118.

Returning to FIG. 1, the product information system 100 may be adapted to provide product information about virtually any type of product that may be offered for sale. For example, the system 100 may provide information about raw material products, intermediate goods, consumer goods, manufactured goods, resale goods, or a combination of any of these. It should be appreciated that these are just a few non-limiting examples of products to which embodiments of the invention may apply. In addition, the system 100 may provide information about products in a wide variety of industries. Some non-limiting examples include industries such as food, beverage, home do-it-yourself, pet care, healthcare, pharmaceuticals, over-the-counter medicines, clothing and fashion, fabric care, medical devices, household care, personal care, automotive care, electronics, furniture, yard care, exercise equipment, and/or home appliances. According to some embodiments, the system 100 may be adapted to provide product information about one or more products in a variety of locations as well. For example, in some cases the system 100 provides product information about products in a retail setting, such as a grocery store, department store, or other retail location. In some cases the system 100 may provide product information about products that are currently in use in the field subsequent to purchase. As such, the system 100 may provide product information before product point-of-purchase and/or after product point-of-purchase.

As discussed above, the product identifier image 102 is associated with the product 104 and provides a way for the handheld device 106 to retrieve appropriate product information from the handheld device for display to a user. Since the product information within the handheld device can in some cases be changed, updated, filtered, manipulated, etc., the product identifier image 102 in combination with the handheld device 106 provides a dynamic product information system that can be used to inform a person about the product 104. In some embodiments, the system 100 includes a different product identifier image 102 for each product within a predefined group of products.

According to some embodiments of the invention, the product identifier image 102 is preferably located within view of the product 104, so that the identifier image 102 is also readily visible to a person viewing the product. In some cases the identifier image 102 is located on the product's packaging and/or directly on the product 104 itself. The identifier image 102 may be printed directly on the product/packaging or be printed on a separate substrate and then affixed to the product/package. In some embodiments the identifier image 102 may be located on signage next to or near the product 104. As just one example, the identifier image 102 may be located on a product shelf directly above or below the product 104 (e.g., next to a SKU and/or price label). While in many cases the product identifier image 102 is located within view of the product, in some embodiments the identifier image 102 may also or instead be located within advertising or elsewhere remote from the actual product 104 itself.

According to some embodiments, the product identifier image 102 can be any type of visual/graphic/textual depiction that is associated with the product 104. In some embodiments the identifier image 102 is a machine-readable code, such as a UPC barcode, a two-dimensional barcode, or other known barcode symbol. In some embodiments the identifier image 102 is a unique or proprietary symbol or graphic associated with the product 104. For example, the identifier image 102 may be a collection of black and white, grayscale, and/or color pixels uniquely associated with the product 104. Those skilled in the art will appreciate that a wide variety of unique identifier images are possible. According to some embodiments, the identifier image 102 is distinct from traditional inventory and stocking numbers and symbols. For example, the identifier image 102 may be placed on product packaging in addition to a UPC barcode.

In some cases the use of distinct images and/or symbols can allow a manufacturer to change the identifier image 102 without affecting other graphics and symbols, such as a UPC barcode. Such capability can be advantageous in situations where it is desirable to take into account changes in product composition or features that are not sufficient to create an entirely separate product with a different inventory number. As just one example, the composition of a specific food product may be fortified or otherwise enhanced or modified, and it may be desirable to indicate changes in the composition through the identifier image 102 while the particular UPC barcode for the product remains the same.

According to some embodiments, the product identifier image 102 may incorporate one or more other features. For example, in some cases the identifier image may include embedded data that can be retrieved with the handheld device's camera, processed, and then displayed to a user. In some embodiments, the product identifier image 102 may include one or more security measures, such as watermarking or authentication printing, that ensures the identifier image is an authorized image. Optional technologies that may enhance and/or enable the functionality of the identifier image 102 or the product packaging or product otherwise, include organic light emitting diodes, printed batteries, film sound emitters, printed logic chips, and/or clothing/accessory integrated computerization.

Figure 2:
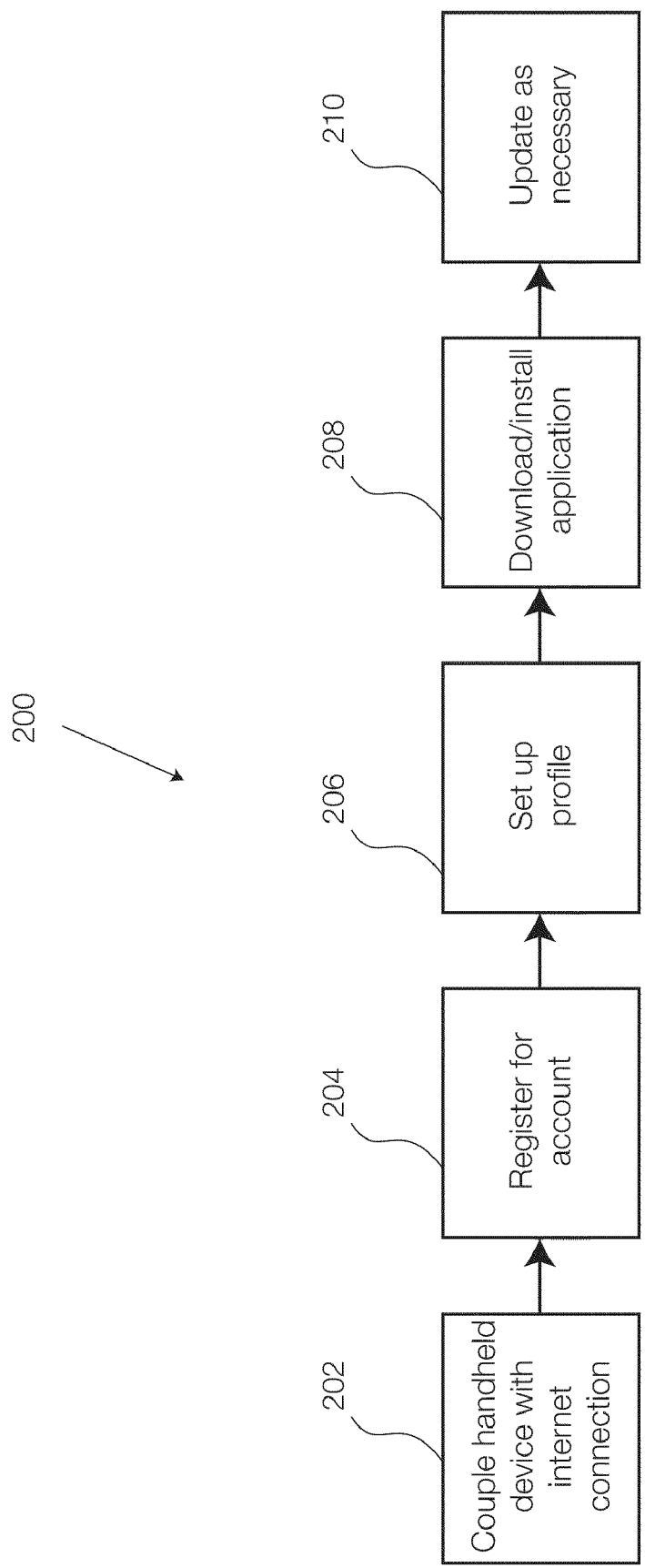
FIG. 2 is a flow diagram of a method for setting up part of a product information system according to some embodiments of the invention.

FIG. 2 is a flow diagram of steps 200 for setting up part of a product information system according to some embodiments of the invention from a handheld device user's perspective. In certain embodiments, a user can install a software application (i.e., set of executable instructions) and a database of product information upon a handheld device to provide information about multiple products. The application and/or database can be retrieved and installed in any suitable manner, such as being downloaded from an Internet website or loaded from a removable computer storage medium. Returning to FIG. 2, in some embodiments the handheld device is first coupled 202 to the Internet to access a product information application and at least one product database. In some cases the handheld device may connect directly to the Internet, e.g., through its own network connection. For example, a laptop or tablet computer may be equipped with an Ethernet or wireless connection for Internet communications. A mobile phone or smart phone may connect to the Internet through a wired connection (e.g., USB), or a wireless connection to a wireless area network. In some cases the handheld device may share an Internet connection with another computer, or connect to the Internet through another computer (e.g., via Bluetooth or another suitable protocol). Alternatively, a mobile phone may connect to the Internet through the phone's cellular network.

In some embodiments a user can navigate to a website that hosts the application and the product database and register 204 for an account with a product information service. After registering for the account, the user may then set up 206 a profile that describes one or more criteria the user would like the application to use when displaying product information to the user. For example, in the case of food products, the user may include food preferences and/or dietary restrictions (e.g., food allergens) in the profile. The user then downloads and installs 208 the product information application, the product database, and the profile onto the user's handheld device. In some embodiments installation of the product information application also includes an access code or PIN on the handheld device which permits access to the user's online account and/or software updates. The user can then use the application on the handheld device to retrieve, filter, and display product information based on specific product identifier images.

In some embodiments the handheld device may routinely request product information (i.e., based on a particular product identifier image) from a remote product database through a network such as the Internet. In some embodiments, however, access to a discrete product database is provided, which can then be stored on the handheld device (e.g., within a memory component) along with the program application. Providing local access to the product database can increase the performance, speed, and reliability of the program application, especially when compared with systems that must connect to a remote database to retrieve product information. For example, in some embodiments the product database and the user's profile are downloaded from a remote server to memory within a mobile phone. Thus, the program application can readily and reliably access information in the product database without the need for connecting through a wireless or cellular network every time product information is requested. This can be especially advantageous in that cellular and wireless internet coverage and bandwidth can in some cases provide sub par performance depending upon the time and location of connection and may require added fees for use of the Internet. When the product database is downloaded to the handheld device, it may be updated 210 as necessary (e.g., daily, weekly, monthly, etc.) to provide the user with the most recent and relevant information provided by the product manufacturers. In some embodiments both methods of communication may be available. As just one example, a device may by default be set to use a locally stored product database, but may be configured at a later time to access product information from a remote database in real time as wireless and cellular networks improve in performance and coverage.

According to some embodiments, one, two, or more product databases may be stored within the memory component of the handheld device. In some cases it may be desirable to include related products within a single product database, while storing other related products within a different product database. One or more databases can then be stored on the handheld device depending upon the product information needs of the user. In some cases a user may also create a separate profile for each distinct database. For example, in some cases a user may install a food product database and a food profile on the handheld device, thus providing product information about a number of food products. The user may also optionally install a beverage product database, a home goods product database, a furniture product database, and so on, along with corresponding user profiles for each database. In other cases a single profile may be compatible with multiple product databases. Also, different manufacturers may optionally provide a number of manufacturer-specific databases that can be simultaneously stored on the handheld device. Thus, while the use of a single product database is described herein in some instances, some embodiments may include two or more product databases and/or distinct user profiles.

The product database can include a variety of product information related to one or more products. In some embodiments the product information is provided in one or multiple formats, such as in audio, video, text, and/or graphic form. In some cases the database includes information associated with a particular product, and also information associated with products related to the particular product. Upon scanning a product identifier image for one product, the handheld device may then be able to retrieve information associated with that product, including information about related products. For example, upon capturing an identifier image for a food product, the handheld device may then retrieve and display information associated with the food product, as well as information about possible recipes for use with the food and/or complementary food products. In this way a manufacturer can promote and advertise related products while informing a consumer about other product options.

According to some embodiments, the product database also includes promotional information associated with one or more products. For example, coupons, discounts, sales, cross-product promotions, etc., may be associated with a particular product and retrieved and displayed along with information associated with the product. In some cases capturing the product identifier image can unlock and provide access to promotional information as an incentive for a user to view and/or purchase the product. For example, scanning a product identifier image may unlock and allow a user to access discounts, rebates, and/or entertainment-related information such as music, video, software, and a variety of other promotional information. In some embodiments a user may be able to unlock and access incremental amounts or successive stages of promotional information by scanning the product identifier images of additional products. Some embodiments promote purchase of a product by allowing content to be unlocked by scanning a product identifier image only accessible after purchase, such as one located within a product's packaging (either replacing or in addition to a product identifier image viewable from outside the product).

Variable amounts of information and/or different types of information may be provided for one or more products within the database. With respect to food products, for example, the product database may in some cases include some or all of the following types of information for one or more food products:

Instructions for product use, e.g., meal preparation videos, visual/video doneness indications, meal variations.

Expanded information, e.g., personalized nutritional information, recipes, diet tracking, detailed nutritional information, nutritional guidelines, links to medical websites and information.

Planning options, e.g., calendar integrated meal planning, inventory integrated meal planning, grocery list development, ingredient list, non-food requirements list, meal variations, leftovers management.

Simplification information, e.g., recipe scaling, accompaniments, cook ahead variations, ingredient substitution.

Organization information, e.g., storage considerations.

Efficiency information, e.g., plot most efficient way through store.

Cost savings options, e.g., coupons, promotion, cross-products promotion, cost saving options/variations, end use cost per serving.

Entertainment options, e.g., games, puzzles, stories, videos, music.

Placement/location information, e.g., cereal aisle, snacks packages, in-store child entertainment, in-store child daycare.

Expert guidance, e.g., novice user content, accomplished user content, expert user content, fringe/occasional user content, problem solving, Q&A, query, content search, do's and don'ts, FAQ's.

Decision assistance, e.g., diet restrictions, allergy warnings.

Positive outcome assurance, e.g., "tried & true" recipes, known successful variations.

Knowledge archiving options, e.g., multiple inputting options, past needs and outcomes, family favorites, fast preparation shortcuts.

In certain embodiments, a product manufacturer can implement a product information system such as one of those described above, by providing one or more products with distinct product identifier images. For example, the manufacturer may provide each products' packaging with a corresponding identifier image. The manufacturer can provide access to a product information application for users through a product information web server. In some cases, for example, the manufacturer may provide a link for downloading the application from a product webpage. After receiving a request from a potential user through the web server to use the application, the web server may direct the user through a registration process to create an account. As part of the registration process, information is requested from the user to generate a user profile that can then be used to filter product information. The application, profile, and in some cases a product database can then be transmitted to the user's handheld device where they are installed and readied for use.

Figure 3:
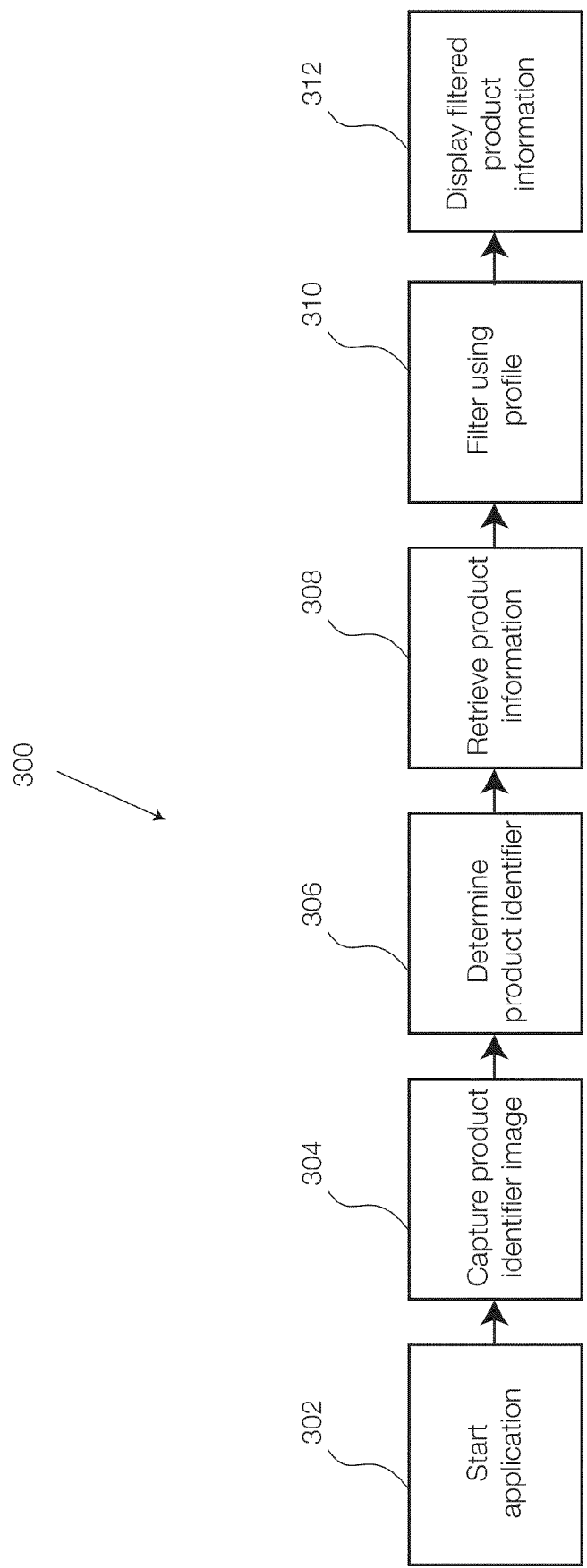
FIG. 3 is a flow diagram of a method for displaying product information according to some embodiments of the invention.

FIG. 3 is a flow diagram of a method 300 for displaying product information with a handheld device, such as the device shown in FIG. 1, according to some embodiments of the invention. After starting 302 the product information application on the handheld device, the handheld device can be used to capture 304 a product identifier image on a product of interest. For example, a photo of the identifier image can be taken using a camera within the handheld device, which then generates a digital characterization of the product identifier image. The device (i.e., through execution of software instructions) then determines 306 a product identifier for the product of interest based on the digital characterization of the product identifier image. For example, in some cases the device may call optical recognition software instructions that recognize the digital characterization by identifying the image and matching it with a known image and associated product identifier within the product database. The product identifier can be any suitable value or string used to index or store product information related to the particular product within the product database.

After determining 306 the product identifier, the device retrieves 308 product information from the product database (e.g., located on a computer-readable storage medium in the handheld device) for eventual display using the product identifier. The product information system thus provides a simple and direct manner of communicating product information to a user similar in some respects to the direct communication of product information that a person encounters when viewing a product or product packaging. In addition, the product information system can provide product information in addition to and beyond the scope of simple product communications normally viewable on the limited surface area of traditional packaging. Accordingly, this method of communicating product information is sometimes described herein as dynamic product information or dynamic product "packaging" that does not require navigating or searching through the database to find the desired product information. In addition, the product information can be updated/changed at times, thus providing dynamic product information/packaging in contrast to static product information on traditional product packaging.

According to some embodiments, product information can only be accessed in this way, based on determining the product identifier after generating a digital characterization of (i.e., capturing) the product identifier image. Accordingly, the product identifier image can in some embodiments act as a key for unlocking product information from the product database and authorizing retrieval, filtering, and/or display. This allows access to the information to be controlled and the time of display to be limited to when a user is actually encountering a product. This is not a required feature in some embodiments, though, and the product information may additionally be searchable by query or menu to allow a user to select desired product information in the absence of a corresponding product identifier image.

After retrieving the information, or as the information is retrieved, the device filters 310 the product information using the profile stored in the device. As part of the filtering process, the device may remove, highlight, condense, or otherwise manipulate certain information based upon criteria within the profile prior to displaying 312 the product information to the user. In one example, a user profile may indicate that a user is restricted from using food products containing lactose. Upon scanning the produce identifier image for a product containing lactose, the handheld device may simply indicate that the product contains lactose, and therefore does not meet the user's profile restrictions. In some cases a user may then choose to see the full product information regardless, or the device may present the user with product information about related lactose-free products.

According to some embodiments, the filtered product information can be subsequently archived for future reference by the user without the need to rescan the product identifier image. For example, the product information application may give the user an opportunity to save the filtered content before another product identifier image is scanned. In some cases the application saves the filtered content in a searchable database and/or the user may select the archived content from a list of saved files.

It should be appreciated that numerous possibilities exist for customizing product information filtering and display in this way, and the invention is not limited to any particular method of filtering or displaying information based on a user's profile. In some embodiments, the handheld device may generate a user query after determining the product identifier or retrieving product information. After receiving an input from the user in response to the query, the device may then further filter and display the product information based on the user's input. For example, after recognizing a product identifier image for a cake mix box, the device may ask the user to input a level of proficiency, such as expert, proficient user, or novice in baking cakes. The user's input can then help define the appropriate skill level and relevant information to be displayed to the user. Such capabilities allow embodiments of the invention to further tailor and customize the display of product information for specific users.

A handheld device 400 and product information software application according to some embodiments of the invention are shown in FIGS. 4A-4M. It should be appreciated that this embodiment is only one example of aspects of the invention, and does not limit the scope of the invention. For example, although FIGS. 4A-4M depict a mobile phone, it should be appreciated that a wide variety of handheld devices may be used in some embodiments of the invention. Similarly, although FIGS. 4A-4M depict a product information application related to food products, it should be appreciated that embodiments of the invention are directed to numerous product industries and stages, as described above. Further, while the figures depict a sequence of product information screens, these screens and their respective options and scope of information are not required in all embodiments of the invention, and may in fact differ in material ways.

Figure 4B:
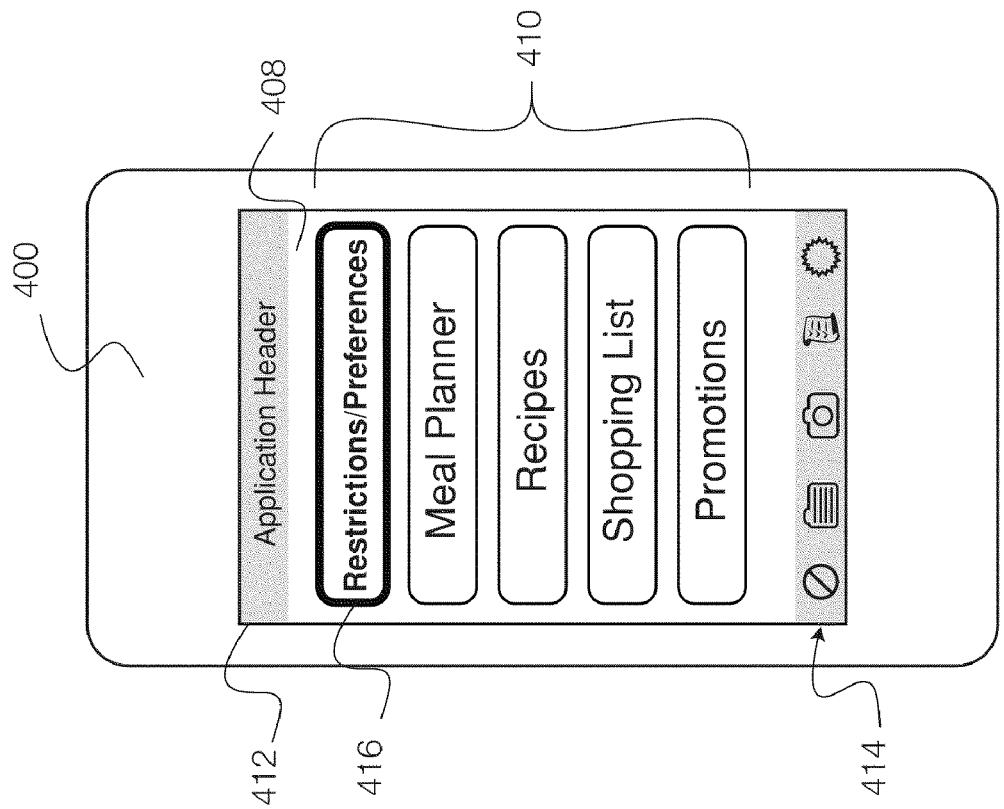
FIG. 4B is a depiction of an application menu screen according to some embodiments of the invention.
Figure 4A:
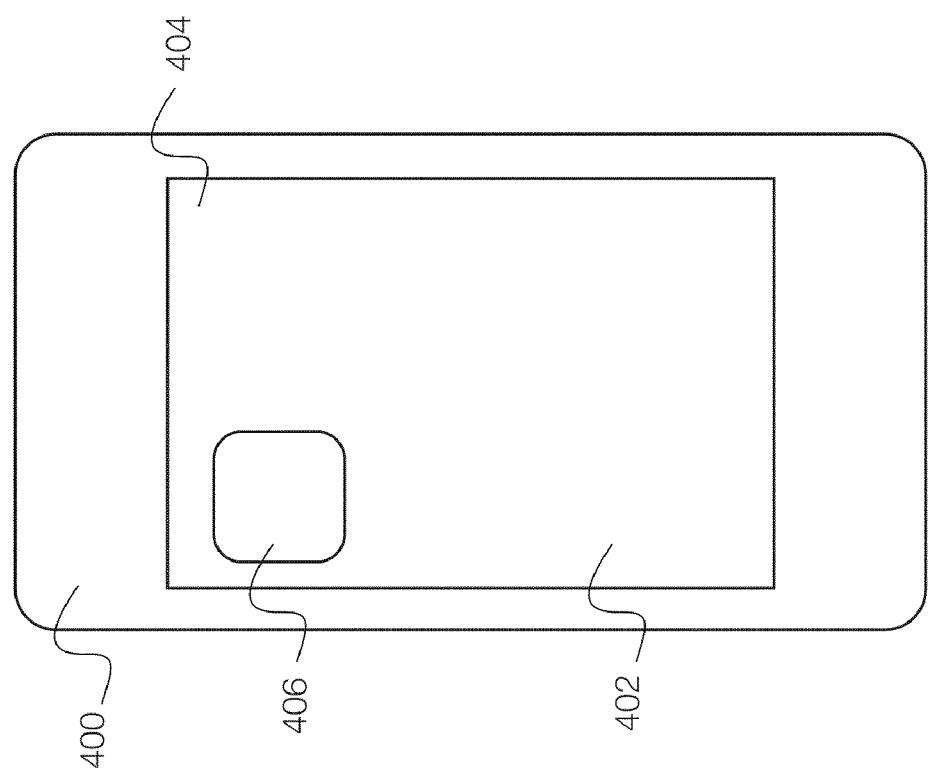
FIG. 4A is a depiction of an application selection screen according to some embodiments of the invention.

Turning to the figures, FIG. 4A is a depiction of a mobile phone 400 having a display screen 402 currently showing an applications screen 404. It will be appreciated that FIG. 4A is a high-level diagram of the mobile phone 400, which may include other features, buttons, and components known in the art. The display screen 402 comprises a touch-sensitive screen that also functions as a user input. The applications screen 404 depicts an icon 406 for a product information software application that may be started by pressing on the icon 406.

According to some embodiments, after starting the application, an application menu screen 408 is displayed as shown in FIG. 4B. The menu screen 408 can include a number of different application options 410 that can be selected by pressing the corresponding icon on the screen. Upon selecting a menu option, the screen may indicate a selection by bolding the corresponding option. In some cases each screen of the application may include an application header 412 and/or menu shortcut icons 414 that can be selected from any screen to jump to another menu option.

Figure 4D:
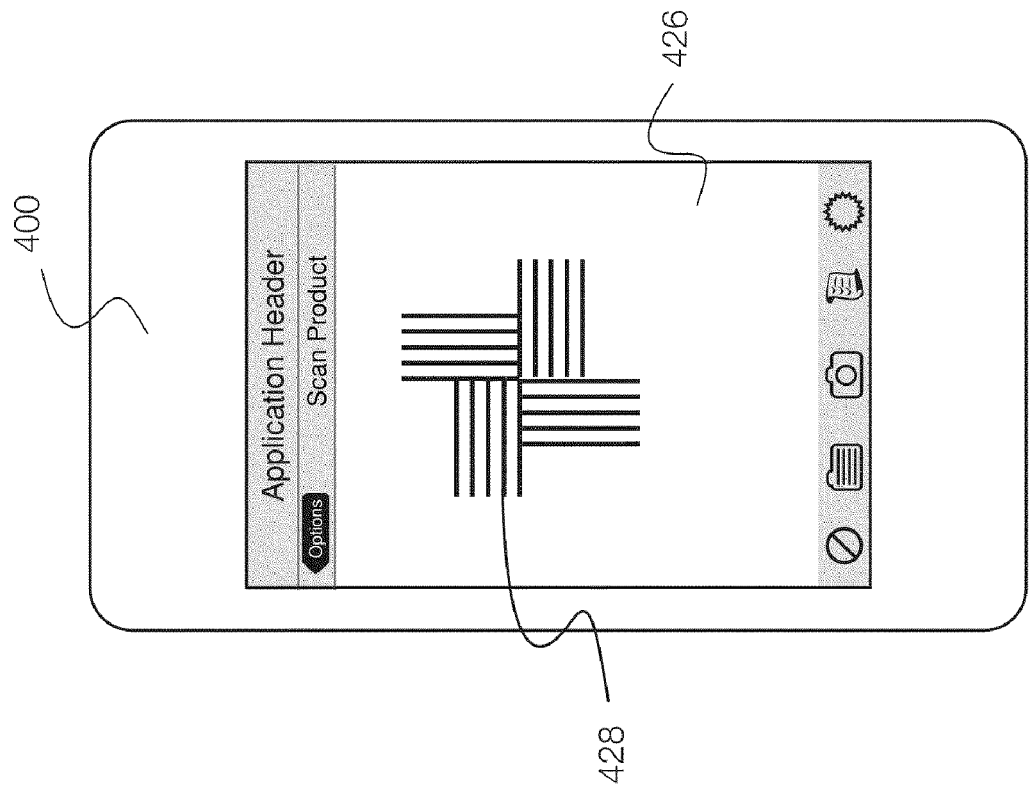
FIG. 4D is a depiction of a scan screen according to some embodiments of the invention.
Figure 4C:
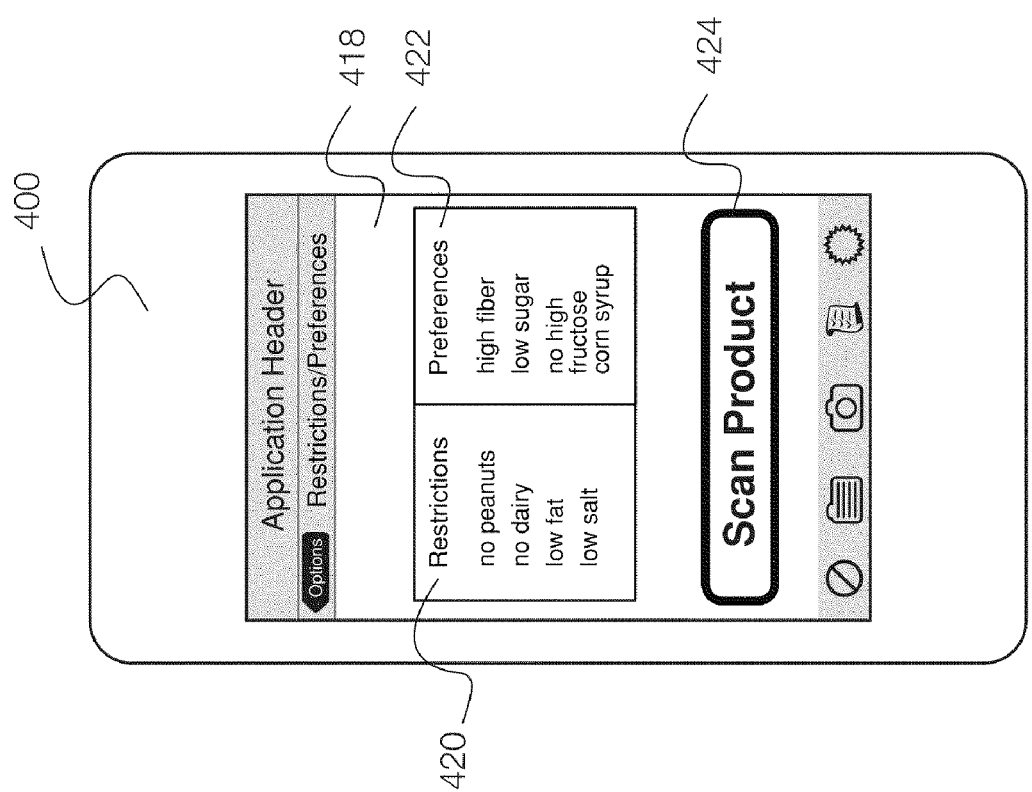
FIG. 4C is a depiction of a profile screen according to some embodiments of the invention.

Upon selecting a "Restrictions/Preferences" menu option 416, the mobile phone 400 displays a profile screen 418 as shown in FIG. 4C. The profile screen 418 displays one or more criteria that the user previously entered to filter product information. In the example shown, the profile screen includes a number of product restrictions 420 in addition to product preferences 422. In some embodiments the user creates the profile through his or her account login on a manufacturer's website, though the profile screen 418 may also allow for set up of or changes to the user profile.

Upon selecting a "Scan Product" icon 424, the mobile phone 400 displays a scan screen 426 as shown in FIG. 4D. The scan screen 426 incorporates the functionality of an integral camera within the phone 400 to capture an image of a product identifier image 428. Accordingly, a user may hold the mobile phone next to the product and capture an image of the identifier image 428 in the usual manner. In some embodiments, the product information application may be initiated from a camera application by, e.g., capturing an image in the usual way and then presenting the user with an option to search the product database for relevant information.

Figure 4E:
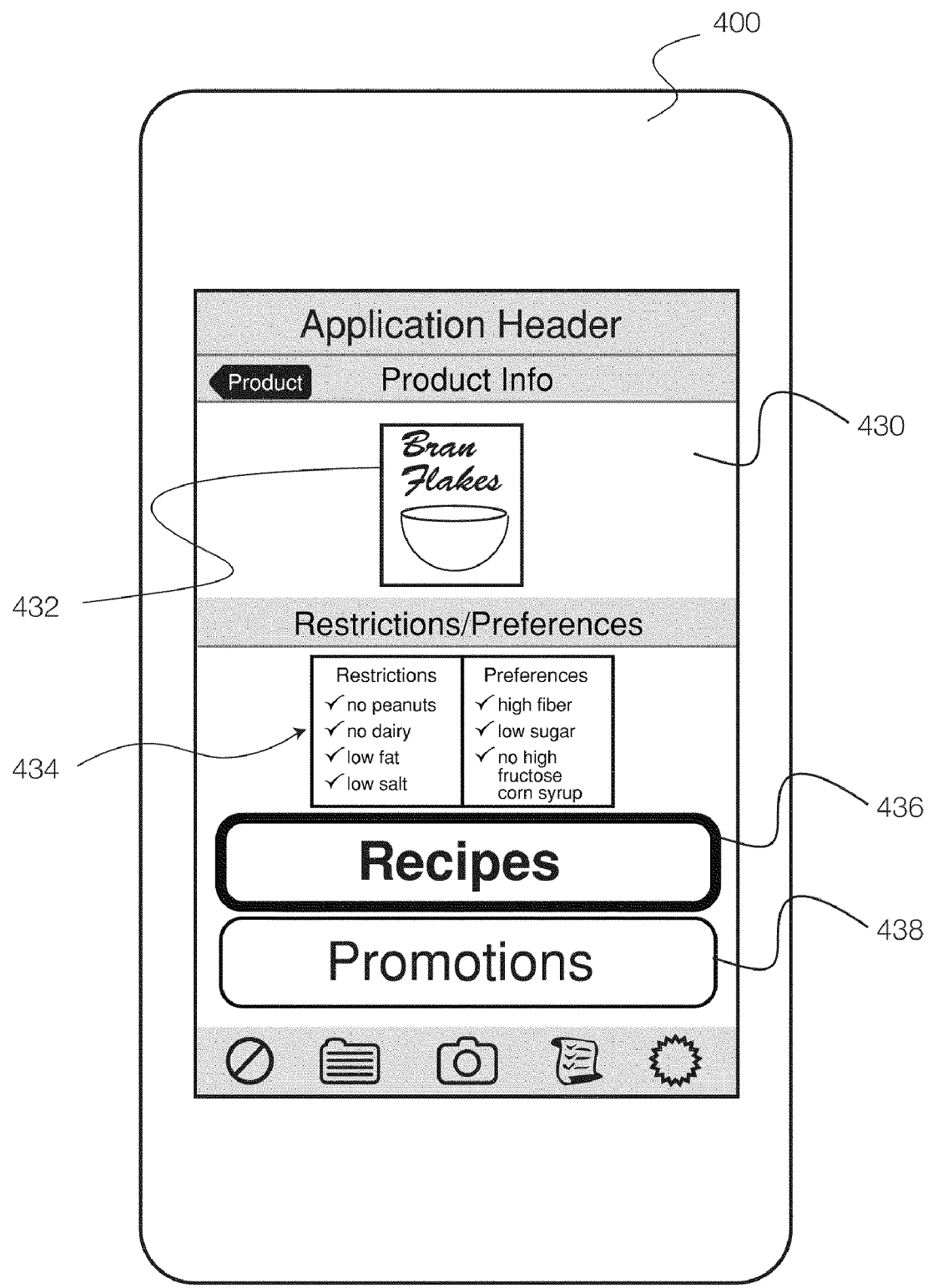
FIG. 4E is a depiction of a product screen according to some embodiments of the invention.

After capturing the identifier image 428, and determining a product identifier and retrieving and filtering associated product information as described above, the mobile phone 400 may then display the filtered product information on a product screen 430 as shown in FIG. 4E. The product screen 430 can include a variety of information, including some or all of the types of information described above. In some cases the product screen includes a product photo 432 and a list 434 of profile criteria met by the product. Further options for related information may also be included via additional selection icons, such as a recipes option 436, a promotions option 438, and the like.

Figure 4F:
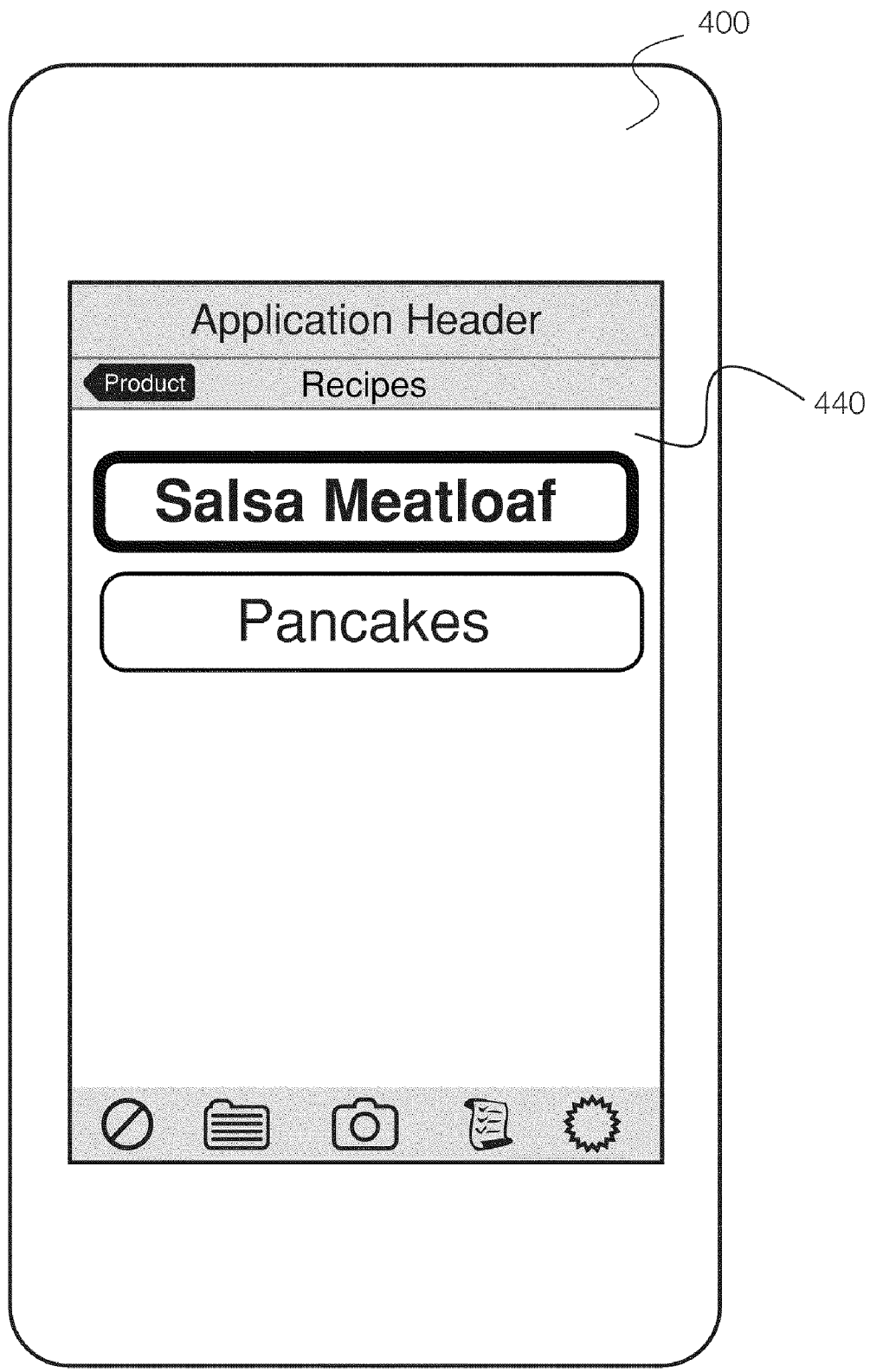
FIG. 4F is a depiction of a recipe selection screen according to some embodiments of the invention.
Figure 4G:
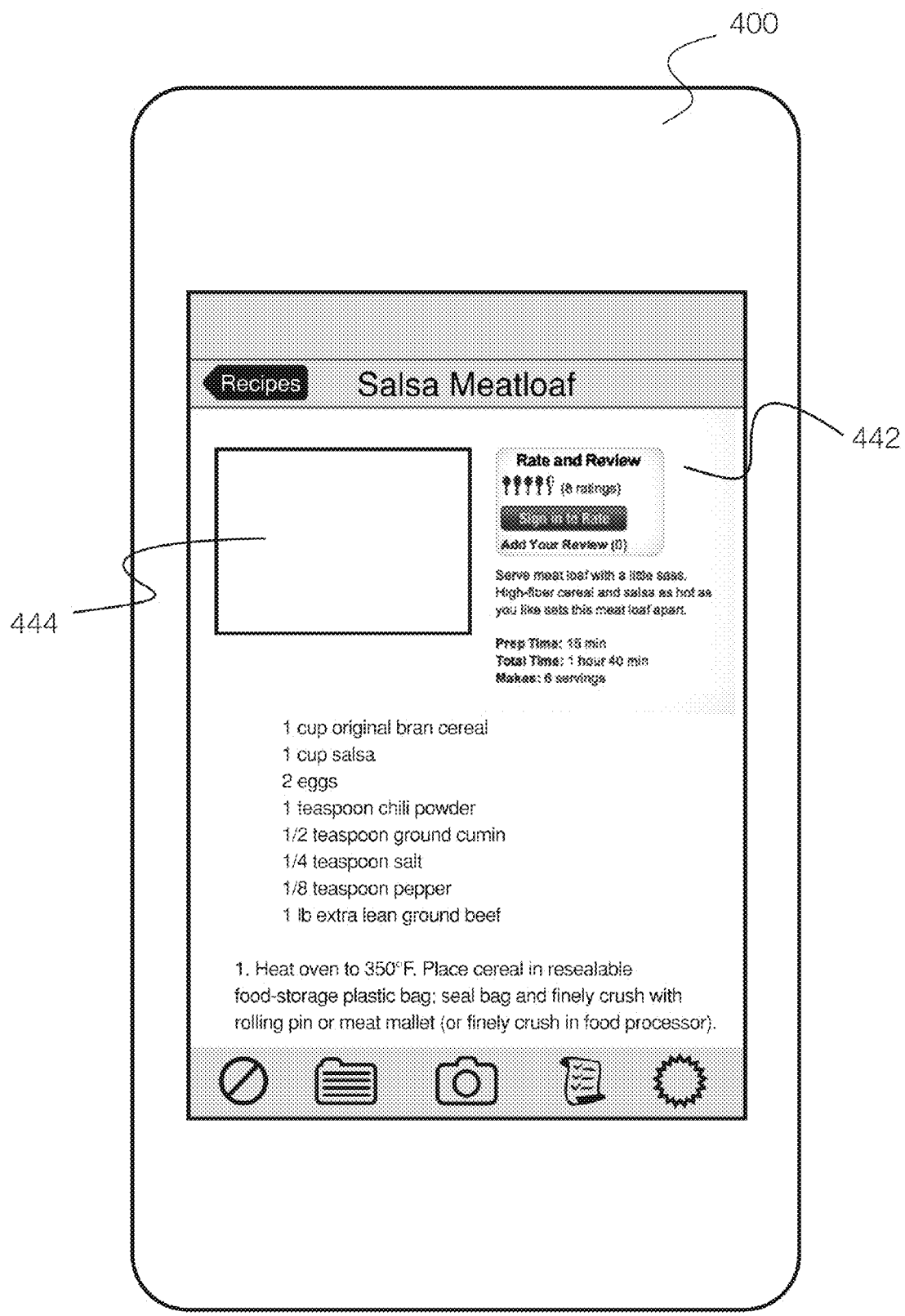
FIGS. 4G-4H are depictions of recipe screens according to some embodiments of the invention.

FIG. 4F is a depiction of a recipe selection screen 440 displayed on the mobile phone 400 according to some embodiments of the invention. The selection screen 440 may display one or more recipes incorporating the currently scanned product. Upon selecting a recipe, the phone displays a recipe screen 442 (FIGS. 4G-4H) that includes a variety of information, including a recipe photo 444, the recipe itself, and further options for additional information. For example, in some cases a user can select the promotions option 438 to see current promotions for ingredients within the recipe. A meal planner option 446 may be offered to suggest complimentary products or dishes for the selected recipe. In some cases the recipe screen 442 may also include an "Add to list" option 448, which allows a user to add all of the ingredients from the recipe to a shopping list stored in the phone 400 (see, e.g., FIG. 4M).

Figure 4H:
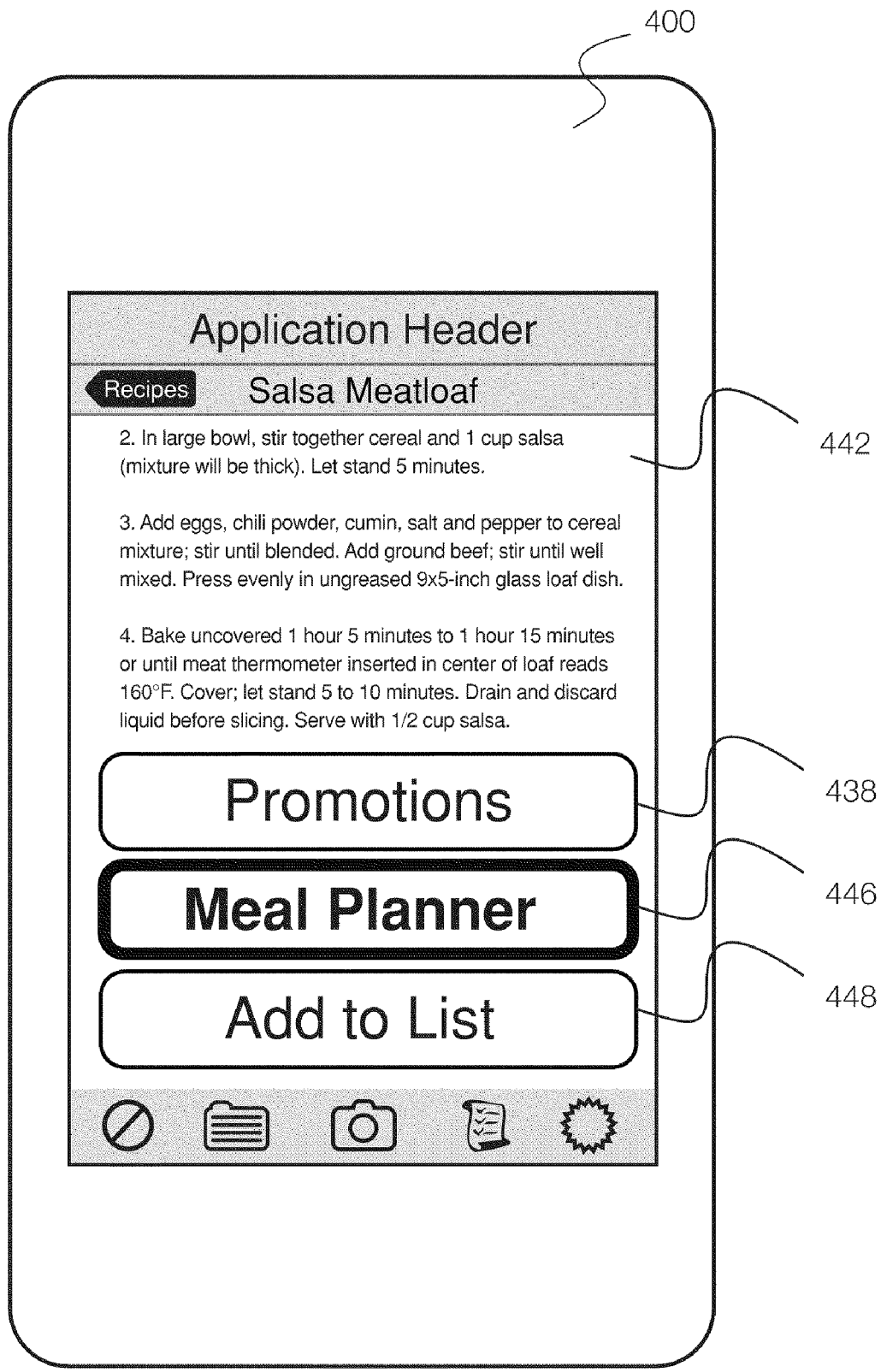
Figure 4J:
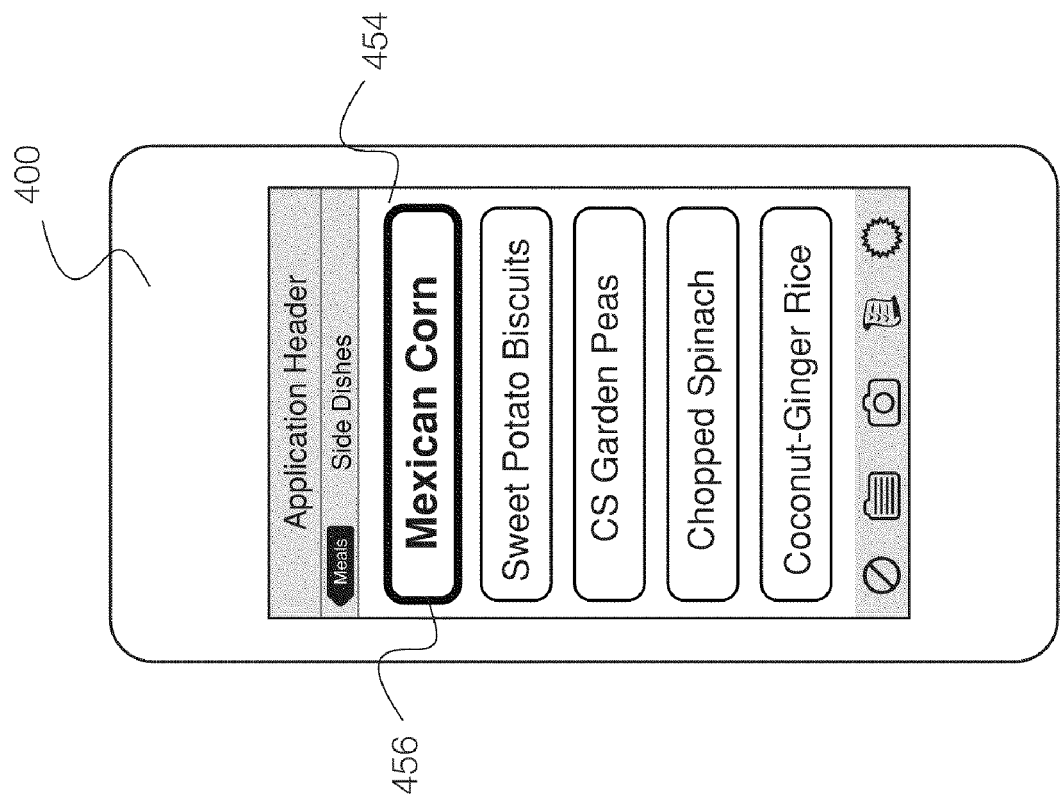
FIG. 4J is a depiction of a side dish selection screen according to some embodiments of the invention.
Figure 4I:
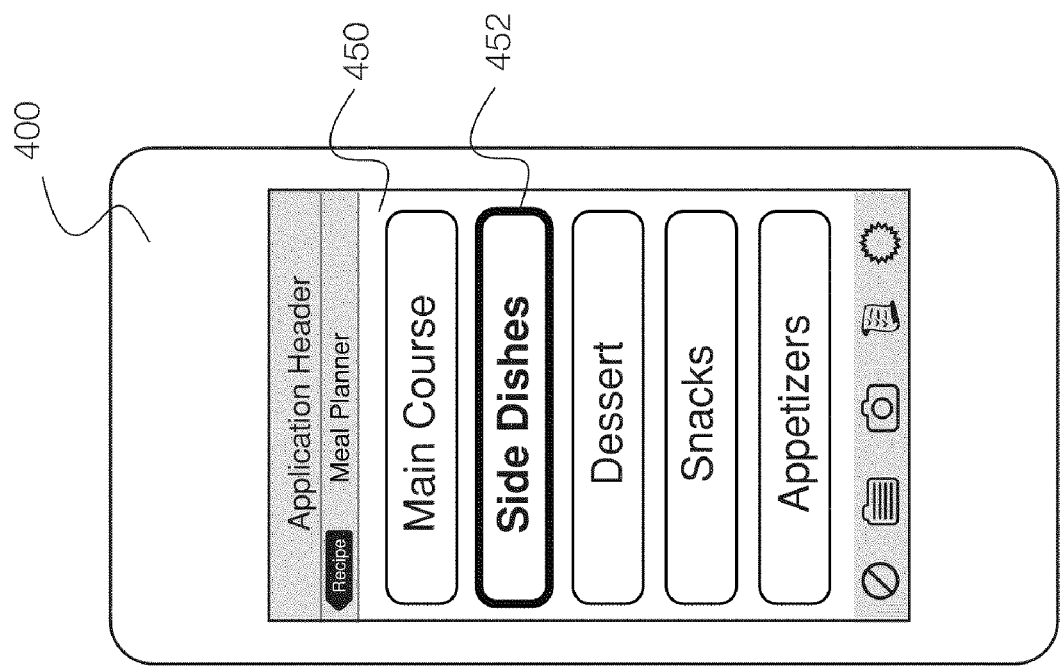
FIG. 4I is a depiction of a meal planner screen according to some embodiments of the invention.
Figure 4K:
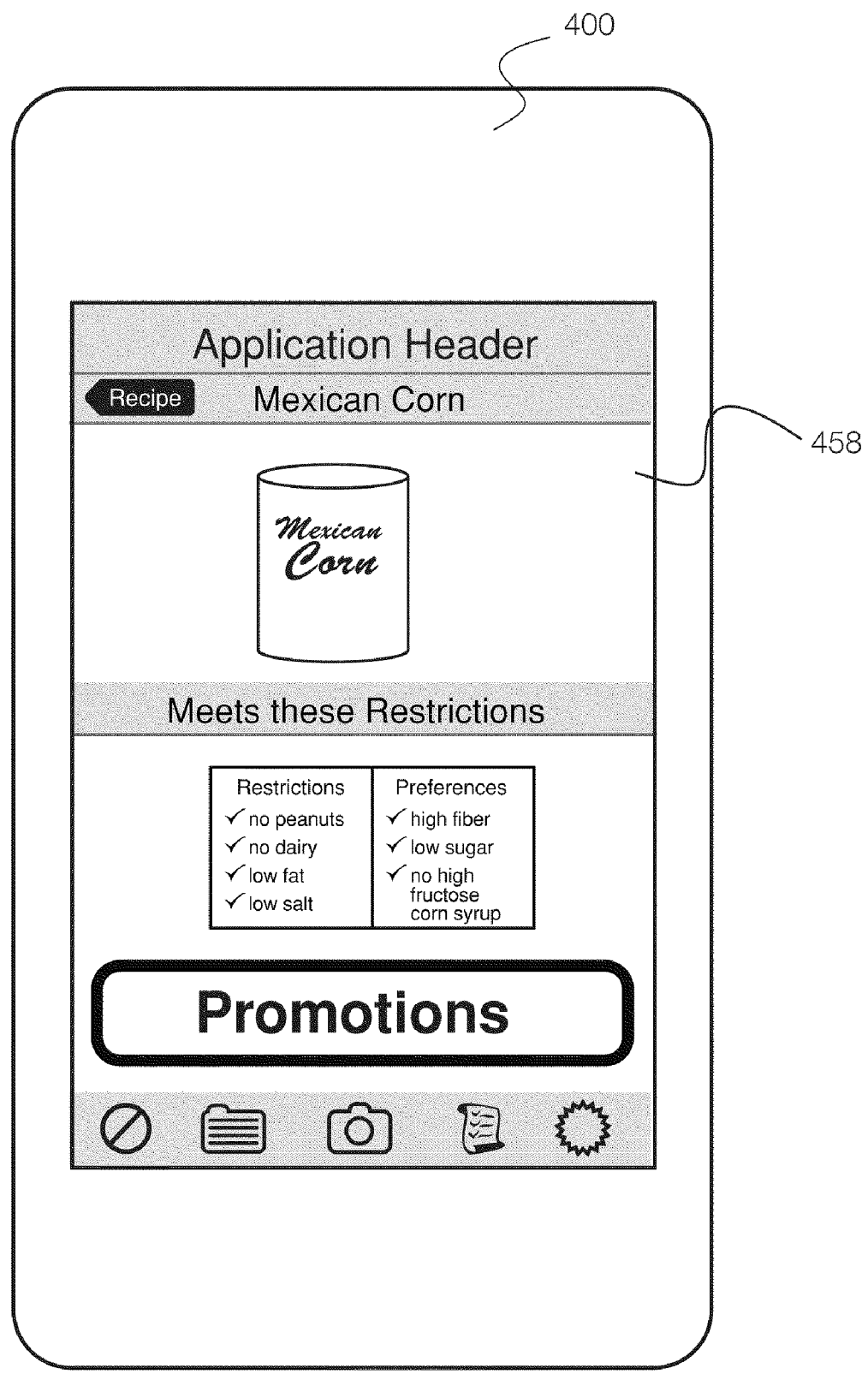
FIG. 4K is a depiction of a side dish product screen according to some embodiments of the invention.

Upon selecting the meal planner option 446, the mobile phone 400 displays a meal planner screen 450 shown in FIG. 4I that in some cases offers options for exploring one or more complementary food dishes. For example, a side dishes option 452 can be selected to bring up a side dish selection screen 454 shown in FIG. 4J. According to some embodiments, the side dish selection screen 454 can list a number of potential side dishes, including stand-alone products and/or recipes incorporating one or more food products. For example, after selecting a "Mexican Corn" option 456, the user is shown a product screen 458 (FIG. 4K) including product information for the selected item. In some embodiments the product information may also be filtered and displayed in a similar manner to the initial product screen illustrated in FIG. 4E.

Figure 4M:
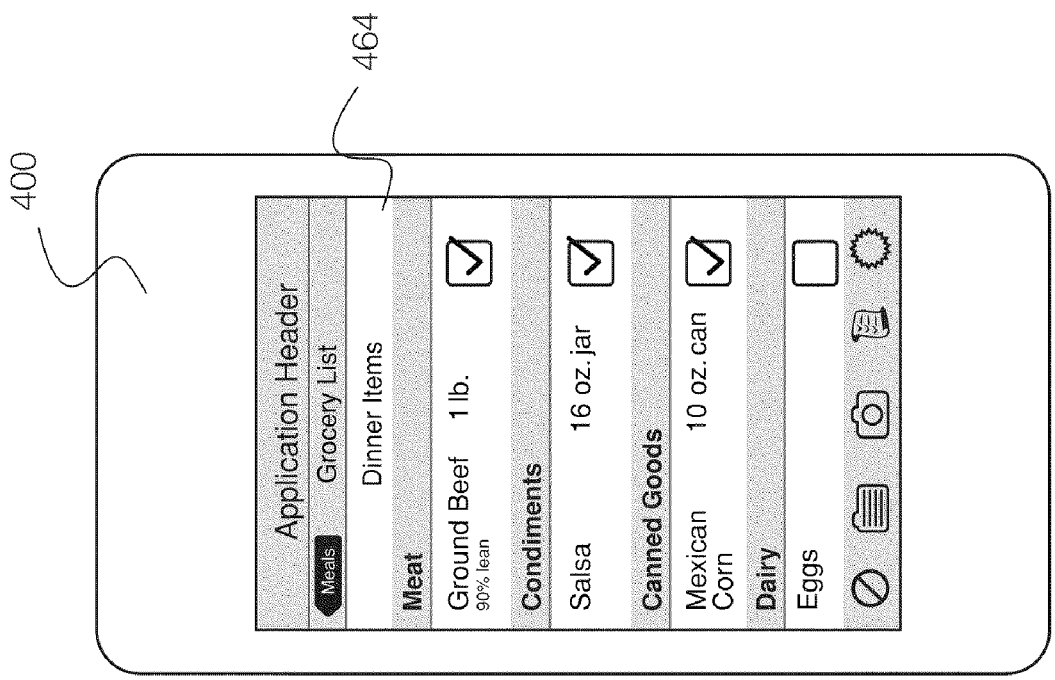
FIG. 4M is a depiction of a grocery list screen according to some embodiments of the invention.
Figure 4L:
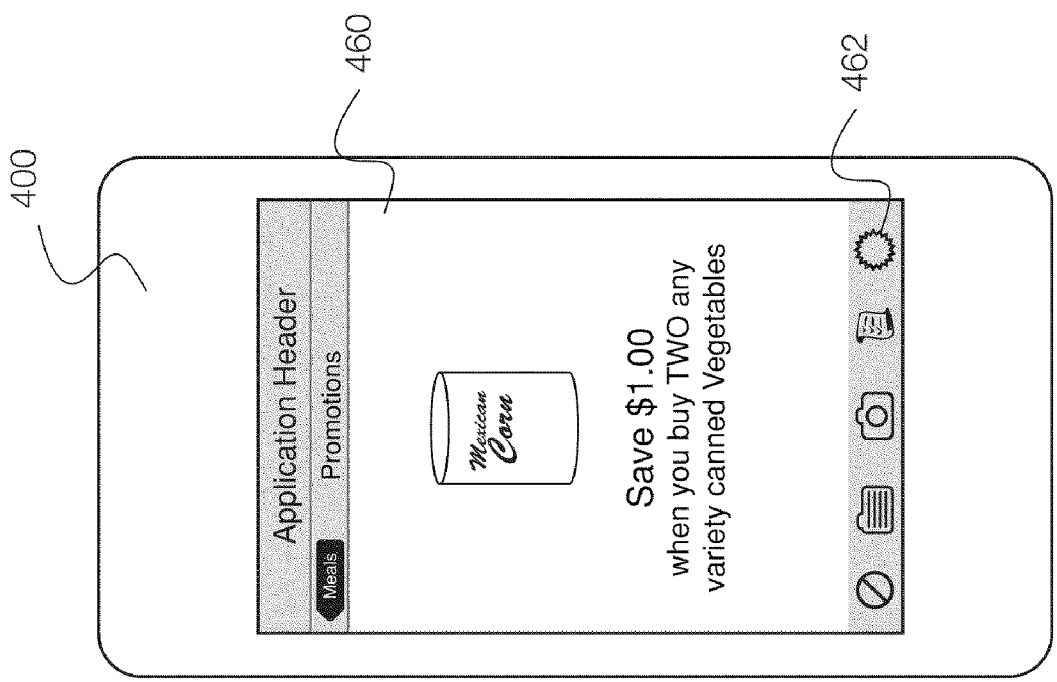
FIG. 4L is a depiction of a promotion screen according to some embodiments of the invention.

FIG. 4L is a depiction of a promotion screen 460 according to some embodiments of the invention. The promotion screen 460 can be selected through one or more button options, as shown in FIGS. 4B, 4E, 4H, and 4K, or may in some cases be selectable through a promotion shortcut 462. The promotion screen 460 can display a wide variety of promotional information associated with the particular product just scanned, or one or more related products. For example, the promotion screen 460 may display electronic coupons and/or discounts, sales, cross-product promotions, and the like. One example of a promotion shown in FIG. 4L includes discounts for the purchase of an increased quantity of a product. Another example could provide discounts for related products upon the purchase of a particular product (e.g., buy this cereal and receive 50 cents off a gallon of milk).

FIG. 4M is a depiction of a grocery list screen 464 according to some embodiments of the invention. The grocery list screen 464 can be populated in a number of ways, including manual entry by the user, through the product information application, as shown in FIG. 4H. In some cases a user can mark items as they are found in the grocery store.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A method for providing product information, comprising:
    generating a digital characterization of a product identifier image with a handheld device, the product identifier image being associated with a product;
    determining a product identifier of the product with the handheld device based on the digital characterization of the product identifier image;
    retrieving product information for the product from a product database stored in a computer-readable storage medium using the product identifier;
    displaying at least part of the product information with the handheld device; and
    restricting access to the product information until after generating the digital characterization of the product identifier image and determining the product identifier with the handheld device.

2. The method of claim 1, further comprising filtering the product information using a profile stored in the handheld device to generate filtered product information to be displayed by the handheld device.

3. The method of claim 2, wherein the profile includes dietary restrictions and/or food preferences.

4. The method of claim 1, wherein the product is a food product.

5. The method of claim 3, further comprising retrieving and displaying recipe information and/or meal information related to the product with the handheld device.

6. The method of claim 5, further comprising automatically adding one or more ingredients from the recipe and/or the meal information to a shopping list with the handheld device.

7. The method of claim 1, wherein the product information comprises promotional information related to the product.

8. The method of claim 1, further comprising retrieving and displaying information for a related product.

9. The method of claim 1, wherein the handheld device is a mobile telephone comprising an integrated camera.

10. The method of claim 1, further comprising displaying the product information during consideration of the product prior to a point-of-sale.

11. The method of claim 1, further comprising displaying the product information after a point-of-sale during use of the product.

12. The method of claim 1, further comprising generating a query after retrieving the product information, receiving an input in response to the query, and displaying at least part of the product information based on the input.

13. The method of claim 1, further comprising connecting the handheld device to a remote server through a network and retrieving at least part of the product information from the remote server using the product identifier.

14. The method of claim 1, wherein the computer-readable storage medium is within the handheld device, and further comprising connecting the handheld device to a remote server through a network and receiving the product database from the remote server.

15. The method of claim 14, further comprising connecting the handheld device to the remote server through the network and receiving an update to the product database from the remote server.

16. A handheld device for providing product information, the device comprising:
 a processor; a display; and a computer-readable storage medium, the computer-readable storage medium comprising instructions executable by the processor for providing product information, comprising
  generating a digital characterization of a product identifier image with the handheld device, the product identifier image being associated with a product,
  determining a product identifier of the product with the handheld device based on the digital characterization of the product identifier image,
  retrieving product information for the product from a product database using the product identifier,
  displaying at least part of the product information with the display of the handheld device, and
  restricting access to the product information until after generating the digital characterization of the product identifier image and determining the product identifier with the handheld device.

17. The device of claim 16, wherein the product is a food product.

18. The device of claim 17, wherein the instructions executable by the processor for providing product information further comprise retrieving and displaying with the handheld device product information from the group consisting of promotional information related to the product, recipe information related to the product, and meal information related to the product.

19. A system for providing product information, the system comprising:
 a plurality of product identifier images associated with respective products; and
 the handheld device according to claim 16.

20. The device of claim 16, wherein the product database is stored in the computer-readable storage medium of the handheld device.

21. The device of claim 20, wherein the computer-readable storage medium further comprises a profile and wherein the instructions executable by the processor comprise filtering the product information using the profile stored in the handheld device to generate filtered product information.

22. A method for providing product information, comprising:
 providing packaging for a product with a product identifier image;
 providing access to a product information application for a handheld device through a product information web server; and
 receiving through the product information web server a request from a user to use the product information application on the handheld device, wherein
 the product information application comprises instructions executable by a processor of the handheld device to
  generate a digital characterization of the product identifier image,
  determine a product identifier of the product based on the digital characterization of the product identifier image,
  retrieve product information for the product from a product database stored in a computer-readable storage medium using the product identifier,
  cause at least part of the product information to be displayed with the handheld device, and
  restricting access to the product information until after generating the digital characterization of the product identifier image and determining the product identifier with the handheld device.

23. The method of claim 22, wherein the product is a food product.

24. The method of claim 23, further comprising retrieving and displaying with the handheld device product information from the group consisting of promotional information related to the product, recipe information related to the product, and meal information related to the product.

25. The method of claim 22, further comprising providing access to one or more product databases for downloading to the handheld device through the product information web server.

26. The method of claim 22, further comprising requesting information from the user and generating a profile based on requested information received from the user and wherein the product information application comprises further instructions executable by a processor of the handheld device to filter the product information with the profile to generate filtered product information.

* * * * *